United States Patent
Nasu

(10) Patent No.: US 11,474,876 B2
(45) Date of Patent: Oct. 18, 2022

(54) DATA PROCESSING DEVICE INCLUDING A DATA COLLECTOR TO COLLECT DATA AND OUTPUT INFORMATION RELATING TO A RESULT OF EXECUTION OF A DATA PROCESSING FLOW, DATA PROCESSING SYSTEM, DATA PROCESSING METHOD, AND PROGRAM

(71) Applicant: Mitsubishi Electric Corporation, Tokyo (JP)

(72) Inventor: Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/439,811

(22) PCT Filed: May 17, 2019

(86) PCT No.: PCT/JP2019/019784
§ 371 (c)(1),
(2) Date: Sep. 16, 2021

(87) PCT Pub. No.: WO2020/234942
PCT Pub. Date: Nov. 26, 2020

(65) Prior Publication Data
US 2022/0091595 A1 Mar. 24, 2022

(51) Int. Cl.
G06F 9/50 (2006.01)
G05B 19/418 (2006.01)

(52) U.S. Cl.
CPC ....... *G06F 9/5083* (2013.01); *G05B 19/4183* (2013.01)

(58) Field of Classification Search
None
See application file for complete search history.

(56) References Cited

U.S. PATENT DOCUMENTS

2013/0148137 A1 6/2013 Nakao
2015/0019591 A1* 1/2015 Visscher ................ G06Q 10/06
707/792

(Continued)

FOREIGN PATENT DOCUMENTS

CN 103093306 A 5/2013
JP 2002-259147 A 9/2002

(Continued)

OTHER PUBLICATIONS

International Search Report and Written Opinion dated Jul. 9, 2019, received for PCT Application PCT/JP2019/019784, Filed on May 17, 2019, 7 pages including English Translation.

(Continued)

*Primary Examiner* — Eric C Wai
(74) *Attorney, Agent, or Firm* — Xsensus LLP

(57) ABSTRACT

A data processing device (10), which is connectable to another data processing device (20), includes a data collector (150) to collect data from a machine (31, 32), a data processor (120) to process input data, a coordination processor (160) to provide the data collector (150) or the data processor (120) with data transmitted from the another data processing device (20) and provide the another data processing device (20) with the data collected by the data collector (150) or the data processed by the data processor (120), and an execution controller (130) to control collection of data by the data collector (150), processing of data by the data processor (120), and transmission and reception of data to and from the another data processing device (20) by the coordination processor (160) in accordance with predetermined setting information for a data processing flow.

12 Claims, 17 Drawing Sheets

(56) References Cited

U.S. PATENT DOCUMENTS

| | | |
|---|---|---|
| 2017/0161108 A1 | 6/2017 | Tamura et al. |
| 2019/0361712 A1 | 11/2019 | Nasu et al. |
| 2020/0169619 A1* | 5/2020 | Bedi ................. G06F 8/313 |

FOREIGN PATENT DOCUMENTS

| | | |
|---|---|---|
| JP | 2009-181384 A | 8/2009 |
| JP | 2013-125333 A | 6/2013 |
| JP | 2017-102777 A | 6/2017 |
| WO | 2018/158956 A1 | 9/2018 |

OTHER PUBLICATIONS

Notification of Reason for Refusal dated Aug. 4, 2020, received for JP Application No. 2020-519817, 10 pages including English Translation.
Notification of Reason for Refusal dated Dec. 15, 2020, received for JP Application No. 2020-519817, 4 pages including English Translation.
Decision to Grant dated Mar. 2, 2021, received for JP Application No. 2020-519817, 5 pages including English Translation.
Office Action dated May 6, 2022, in corresponding Chinese patent Application No. 201980096360.7, 12 pages.

* cited by examiner

| SUBPROCESS ID | PLATFORM ID | SUBPROCESS NAME | PRETREATMENT | AFTERTREATMENT |
|---|---|---|---|---|
| \multicolumn{5}{|c|}{FLOW SETTINNG INFORMATION} |

| SUBPROCESS ID | PLATFORM ID | SUBPROCESS NAME | PRETREATMENT | AFTERTREATMENT |
|---|---|---|---|---|
| 411 | 50 | COLLECTION | — | MODIFICATION |
| 412 | 50 | MODIFICATION | COLLECTION | DIAGNOSIS |
| 421 | 51 | DIAGNOSIS | MODIFICATION | OUTPUT |
| 422 | 51 | OUTPUT | DIAGNOSIS | — |

DATA PROCESSING DEVICE INCLUDING A DATA COLLECTOR TO COLLECT DATA AND OUTPUT INFORMATION RELATING TO A RESULT OF EXECUTION OF A DATA PROCESSING FLOW, DATA PROCESSING SYSTEM, DATA PROCESSING METHOD, AND PROGRAM

CROSS-REFERENCE TO RELATED APPLICATION

The present application is based on PCT filing PCT/JP2019/019784, filed May 17, 2019, the entire contents of which are incorporated herein by reference.

TECHNICAL FIELD

The present disclosure relates to a data processing device, a data processing system, a data processing method, and a program.

BACKGROUND ART

In the field of factory automation, data is collected and analyzed by a cloud server and data processing devices distributed in a so-called edge area, which is located closer to a factory than the cloud server. The data processing devices in the edge area collect data from factory automation (FA) machines, such as production machine, sensor, and driving machine, in a manufacturing factory, and execute a series of data processing, such as modification and diagnosis, on the collected data in the order defined in a data processing flow.

Patent Literature 1 discloses a real-time distributed processing system, in which multiple tasks are assigned to multiple arithmetic units connected to each other via a network to achieve distributed processing.

CITATION LIST

Patent Literature

Patent Literature 1: Unexamined Japanese Patent Application Publication No. 2002-259147

SUMMARY OF INVENTION

Technical Problem

Although the technique of distributed processing has been known as disclosed in Patent Literature 1, none of the existing techniques is directed to distributed processing of a data processing flow in data processing devices in the edge area.

In addition, the technique disclosed in Patent Literature 1 is mainly aimed at ensuring the reliability of a task by causing different arithmetic units to execute the same task and confirming whether these units provide the same result. The arithmetic units do not have a function of executing a series of tasks in coordination with each other.

This system thus cannot achieve distributed processing of a data processing flow, and cannot cause multiple data processing devices to execute a series of data processing in coordination with each other.

An objective of the disclosure, which has been accomplished in view of the above situations, is to cause multiple data processing devices to execute a series of data processing in coordination with each other.

Solution to Problem

In order to achieve the above objective, a data processing device according to an aspect of the disclosure is connectable to another data processing device, and includes: a data collector to collect data from a machine; a data processor to process input data; a coordination processor to provide the data collector or the data processor with data transmitted from the another data processing device, and provide the another data processing device with the data collected by the data collector or the data processed by the data processor; and an execution controller to control collection of data by the data collector, processing of data by the data processor, and transmission and reception of data to and from the another data processing device by the coordination processor, in accordance with predetermined setting information for a data processing flow.

Advantageous Effects of Invention

According to an aspect of the disclosure, the data processing device includes the coordination processor to provide the data collector or the data processor with data transmitted from the another data processing device and provide the another data processing device with the data collected by the data collector or the data processed by the data processor, and the execution controller to control collection of data by the data collector, processing of data by the data processor, and transmission and reception of data to and from the another data processing device by the coordination processor, in accordance with the predetermined setting information for the data processing flow. This configuration can therefore cause multiple data processing devices to execute a series of data processing in coordination with each other.

BRIEF DESCRIPTION OF DRAWINGS

FIG. 5 illustrates an example of flow setting information according to the embodiment;

DESCRIPTION OF EMBODIMENTS

A data processing device according to an embodiment of the disclosure will now be described in detail with reference to the accompanying drawings.

Embodiment 1

Data processing devices 10 and 20 according to the embodiment are edge devices installed in a manufacturing factory and located in the edge computing area between the area of FA machines and the cloud. The data processing devices 10 and 20 pick up data from the FA machines, executes modification and diagnosis on the data, and returns the data to the FA machines. If this process is executed by the cloud at a remote site, the processing takes a long time. In order to solve this problem, the real-time data processing is assigned to the data processing devices 10 and 20. This configuration can avoid a delay in the real-time data processing and optimize the amount of data to be transmitted to the cloud.

The data processing devices 10 and 20 are industrial computers installed in the same factory. The data processing devices 10 and 20 may also be installed in different factories and connected to each other via a wide area network. The data processing device 10 executes a series of data processing in coordination with the another data processing device 20. The data processing executed in the data processing devices 10 and 20 corresponds to the control for operating a production line that manufactures products.

Figure 1:
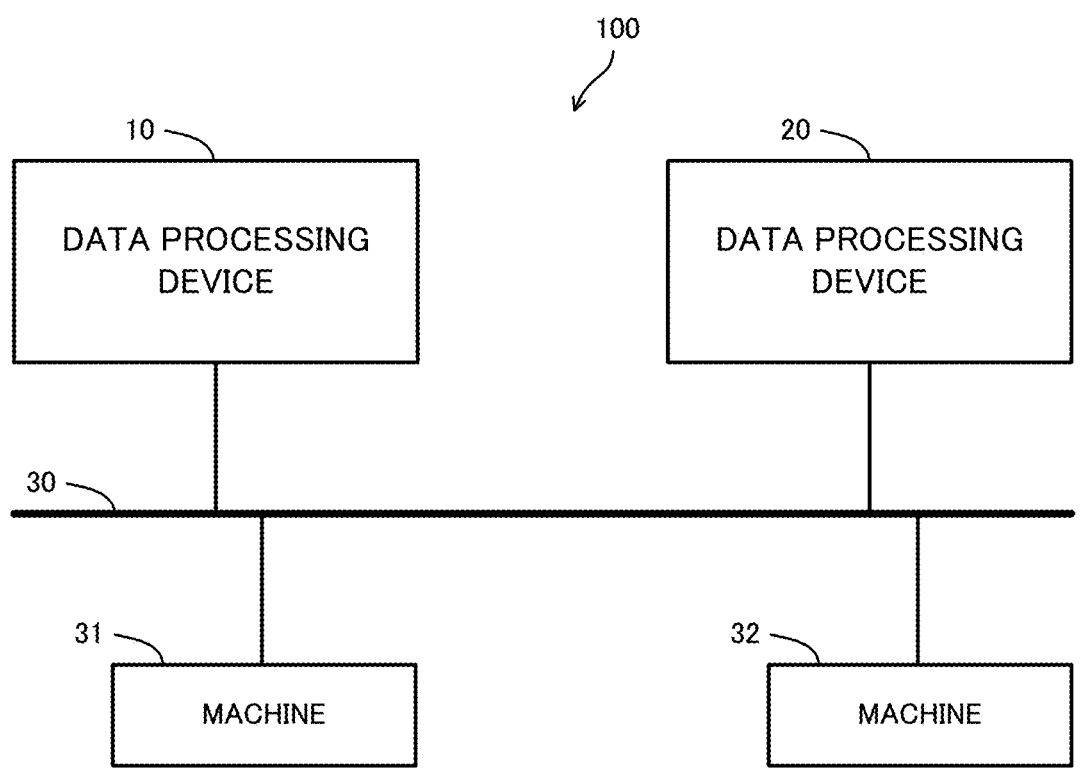
FIG. 1 is a block diagram illustrating a configuration of a data processing system according to an embodiment of the disclosure.

As illustrated in FIG. 1, the data processing device 10 constitutes a data processing system 100 together with the data processing device 20. The data processing system 100 further includes machines 31 and 32 as well as the data processing devices 10 and 20.

The data processing devices 10 and 20 and the machines 31 and 32 are connected so as to communicate with each other via communication paths 30. The communication paths 30 correspond to an industrial control network configured by communication lines installed in the factory. The communication paths 30 may also be an information network represented by a local area network (LAN). Alternatively, the communication paths 30 may be dedicated lines or a wide area network represented by the Internet. Although the data processing devices 10 and 20 are connected to the machines 31 and 32 via a single type of transmission lines in FIG. 1, this configuration is a mere example. The data processing device 10 may be connected to the machines 31 and 32 via a dedicated line, while the data processing device 10 may be connected to the data processing device 20 via a wide area network, for example.

The machine 31 is a sensor device installed in a production line and includes, for example, a sensor for measuring a physical quantity represented by pressure, ultrasonic wave, or light. The machine 31 outputs data indicating a result of measurement at the sensor to the communication path 30 at regular intervals. The cycle of output of measurement results from the machine 31 is, for example, 1 millisecond, 100 milliseconds, or 1 second. The machine 32 is an actuator or robot installed in the production line and operates in accordance with control commands. This configuration is a mere example. The machine 31 is not necessarily be a sensor and may be an actuator or robot, for example. The machine 32 is not necessarily an actuator or robot and may be a sensor, for example. Alternatively, the machine 31 or 32 may be a programmable logic controller (PLC) to control another machine, such as sensor, actuator, or robot.

The series of real-time data processing is configured by combining collection of data, modification, diagnosis, and feedback, for example. Examples of the modification of data include smoothing, sharpening, and fast Fourier transform (FFT) of data. Examples of the diagnosis of data include determination using a threshold and pattern matching. The feedback indicates a notification of the diagnosis result. A typical example of the feedback is writing of an instruction to stop, decelerate, or restart machines in the manufacturing factory. Such a combination of processing modules is called a data processing flow. In the data processing system 100, the multiple data processing devices 10 and 20 achieve distributed processing of individual data processing modules in a data processing flow in coordination with each other.

Figure 2:
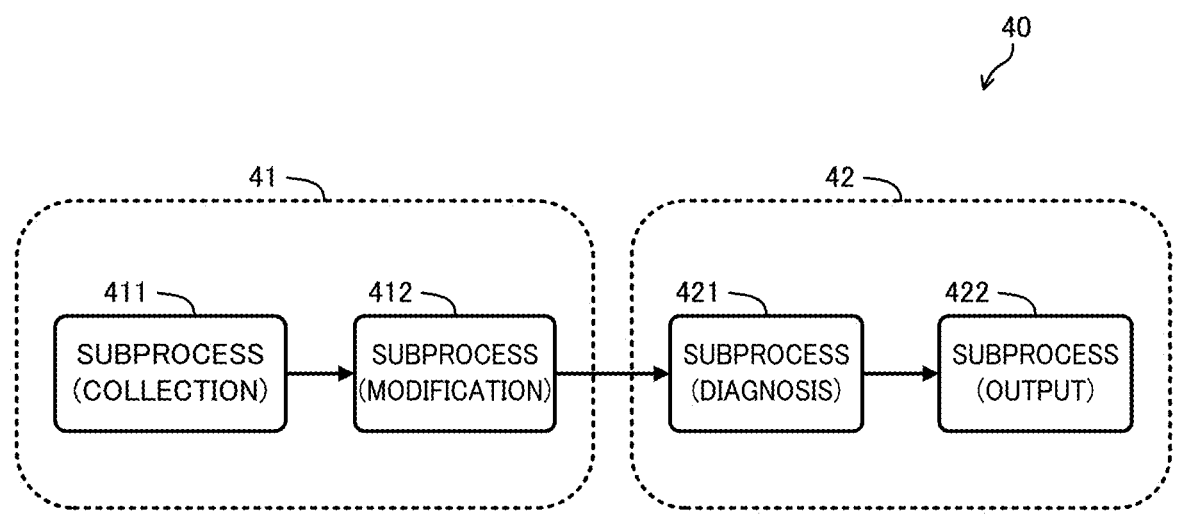
FIG. 2 illustrates an example of a data processing flow according to the embodiment.

FIG. 2 illustrates an example of a data processing flow 40 achieved by coordination of the data processing devices 10 and 20. The data processing flow 40 involves a series of subprocesses directed to data collected from the machine 31. In detail, the data processing flow 40 involves subprocesses 41 executed in the data processing device 10, and subprocesses 42 executed in the data processing device 20. This configuration is a mere example. Alternatively, the subprocesses 41 may be executed in the data processing device 20, while the subprocesses 42 may be executed in the data processing device 10.

The subprocesses 41 involve a subprocess 411 and a subprocess 412 as components, and the subprocesses 42 involve a subprocess 421 and a subprocess 422 as components. The subprocess 411 corresponds to a process of collecting data from the machine 31, and the subprocess 412 corresponds to a process of modifying the data output as a result of the subprocess 411. Examples of the process of modifying the data include reducing noise and treating fractions. The subprocess 421 corresponds to a process of diagnosing the data output as a result of the subprocess 412. Examples of the process of diagnosing the data include determining control commands directed to the machine 32 and determining the existence of errors. The subprocess 422 corresponds to a process of outputting the data, which indicates the diagnosis result output as a result of the subprocess 421, to the outside. A typical example of the process of outputting the diagnosis result is transmitting the control commands to the machine 32. In accordance with the data processing flow 40 illustrated in FIG. 2, the series of processing involving the subprocesses 411, 412, 421, and 422 is executed in response to every output of measurement results from the machine 31. The details of control for the machine 32 are then determined depending on the value after reduction of noise from the measurement results, followed by transmission of the control commands.

Although the processing modules may be distributed at random, each processing module is more preferably be assigned to an expert device among the data processing devices. Instead of simple assignment of the first half of the processing modules to the data processing device 10 and the second half to the data processing device 20, the processing modules may be distributed in a more complicated manner for achieving an ideal arrangement. In this complicated distribution, the data processing devices 10 and 20 may transmit and receive data to and from each other frequently until completion of the series of processing.

Figure 3:
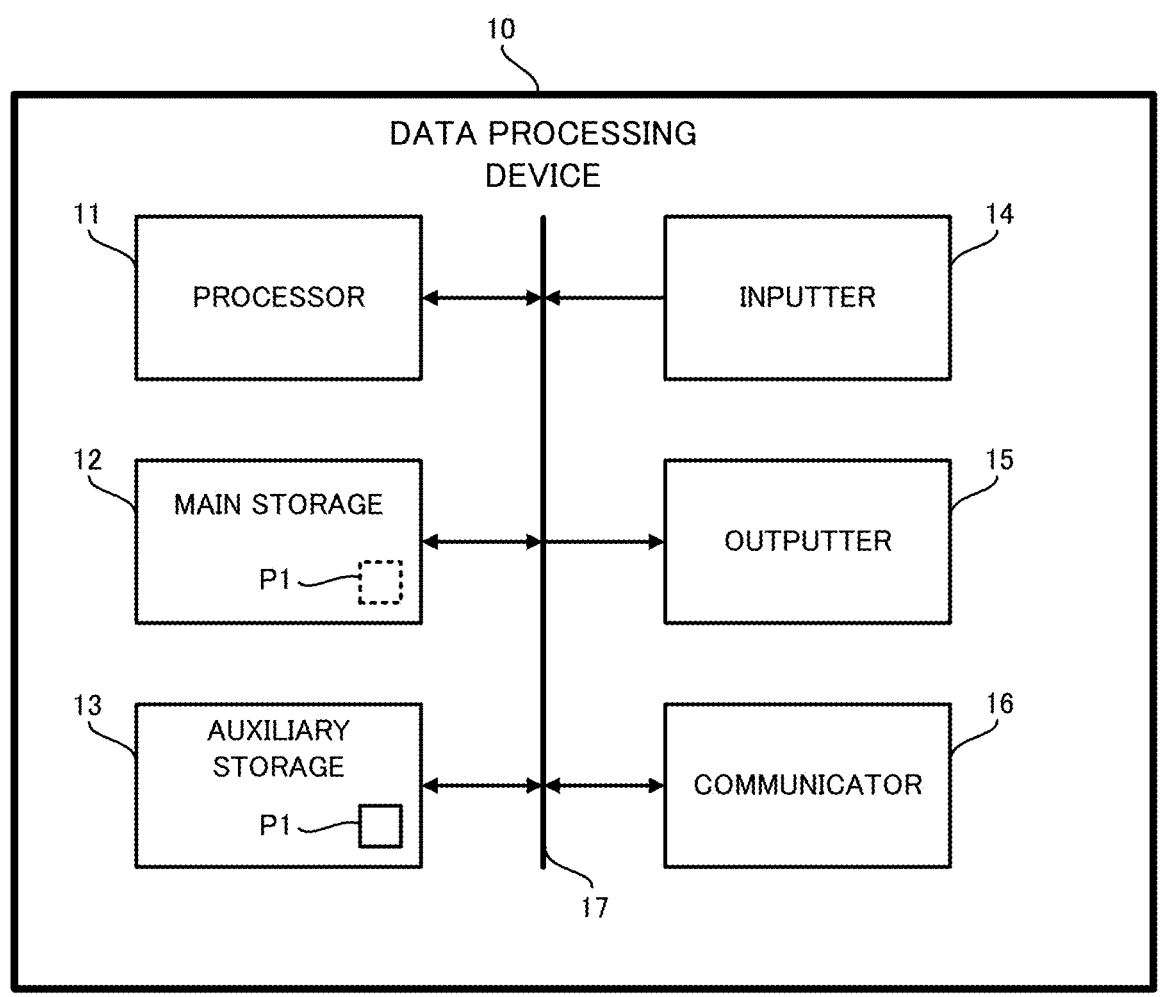
FIG. 3 is a block diagram illustrating a hardware configuration of a data processing device according to the embodiment.

As illustrated in FIG. 3, the data processing device 10 has a hardware configuration including a processor 11, a main storage 12, an auxiliary storage 13, an inputter 14, an outputter 15, and a communicator 16. The main storage 12, the auxiliary storage 13, the inputter 14, the outputter 15, and the communicator 16 are each connected to the processor 11 via internal buses 17.

The processor 11 includes a central processing unit (CPU). The processor 11 executes a program P1 stored in the auxiliary storage 13 and thereby performs various functions of the data processing device 10 and executes the below-explained operations.

The main storage 12 includes a random access memory (RAM). The program P1 is loaded from the auxiliary storage 13 into the main storage 12. The main storage 12 serves as a work area of the processor 11.

The auxiliary storage 13 includes a non-volatile memory, represented by an electrically erasable programmable read-only memory (EEPROM) or a hard disk drive (HDD). The auxiliary storage 13 stores the program P1 and various types of data used in processes in the processor 11. The auxiliary storage 13 provides the processor 11 with data to be used by the processor 11 and stores data fed from the processor 11 under the instructions from the processor 11. Although FIG. 3 illustrates a single program P1 as a representative, the auxiliary storage 13 may store multiple programs, and the programs may be loaded into the main storage 12.

The inputter 14 includes an input device, represented by an input key or pointing device. The inputter 14 acquires information input by a user of the data processing device 10 and provides the acquired information to the processor 11.

The outputter 15 includes an output device, represented by a liquid crystal display (LCD) or speaker. The outputter 15 presents various types of information to the user under the instructions from the processor 11.

The communicator 16 includes a network interface circuit to communicate with external apparatuses. The communicator 16 receives signals from the outside and outputs data indicated by the signals to the processor 11. The communicator 16 also transmits signals indicating the data output from the processor 11 to external apparatuses.

Figure 4:
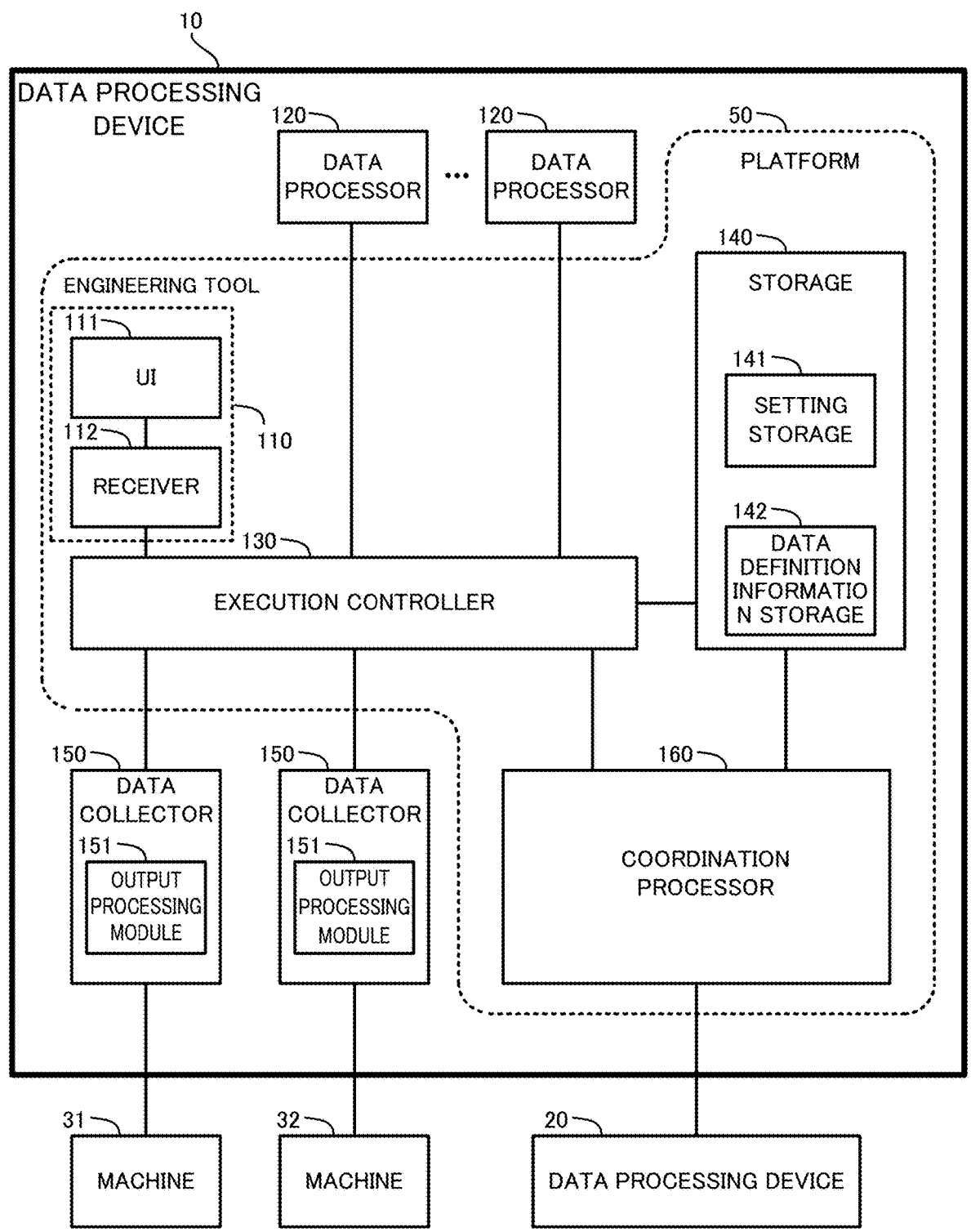
FIG. 4 illustrates a functional configuration of the data processing device according to the embodiment.

The hardware components illustrated in FIG. 3 cooperate with each other and thereby allow the data processing device 10 to perform various functions. In detail, as illustrated in FIG. 4, the data processing device 10 has a functional configuration including an engineering tool 110 to allow the user to set a data processing flow, data processors 120 to execute subprocesses constituting the data processing flow, an execution controller 130 to cause the data processors 120 and data collectors 150 to execute the subprocesses, a storage 140 to store various types of data, the data collectors 150 to collect data, and a coordination processor 160 to establish connection to the data processing device 20 and achieve coordinated data processing.

The engineering tool 110, the execution controller 130, the storage 140, and the coordination processor 160 form a platform 50 to execute the data processing flow. The platform 50 executes the data processing flow in coordination with another platform, which is formed in the data processing device 20 as in the data processing device 10.

The engineering tool 110 sets setting information for the data processing flow, which indicates setting items necessary for execution of the data processing flow. The setting information for the data processing flow will be hereinafter referred to as "flow setting information" as appropriate. The engineering tool 110 includes a user interface (UI) 111 to allow the user to input setting items for the data processing flow, and a receiver 112 to receive the setting items for the data processing flow. The UI 111 corresponds to a touch screen mainly achieved by the inputter 14 and the outputter 15. The UI 111 displays a screen for input of setting items for the data processing flow to the user, under the control by the receiver 112. The user manipulates the UI 111 and thereby arbitrarily sets the contents and number of the subprocesses constituting the data processing flow, parameters necessary for execution of the subprocesses, and the platform to execute the subprocesses. The UI 111 then outputs information, which indicates the setting items for the data processing flow input by a manipulation of the user, to the receiver 112. The UI 111 may also be configured by a display, a keyboard, and a pointing device represented by a mouse.

The receiver 112 is mainly achieved by the processor 11. The receiver 112 receives the setting items for the data processing flow from the UI 111, and informs the execution controller 130 of the flow setting information indicating the setting items. The flow setting information provided to the execution controller 130 is stored into a setting storage 141 of the storage 140.

The setting items for the data processing flow are not necessarily received at the receiver 112. Alternatively, the user may manipulate not the UI 111 of the data processing device 10 but the data processing device 20 to input setting items for the data processing flow. The user is allowed to manipulate either of the data processing devices 10 and 20 to set the data processing flow. In the case where the user inputs setting items for the data processing flow to the data processing device 20, flow setting information indicating the setting items for the data processing flow is shared with the data processing device 10 by being transmitted from the data processing device 20 to the data processing device 10. The sharing of information will be explained in detail below.

The data processors 120 are mainly achieved by the processor 11. Each of the data processors 120 is achieved by the program P1 preliminarily installed in the data processing device 10 or plug-in software prepared by the user. The data processor 120 executes a subprocess, which is a component constituting the data processing flow. In detail, the data processor 120 acquires the data, input from the execution controller 130, to be subject to a subprocess, and outputs the result of the subprocess on the acquired data to the execution controller 130. In FIG. 2, the subprocess 412, among the subprocesses 41 executed in the data processing device 10, is executed by any of the data processors 120.

The execution controller 130 is mainly achieved by the processor 11. The execution controller 130 causes the data processors 120 and the data collectors 150 to execute the subprocesses in the order in accordance with the flow setting information. In detail, the execution controller 130 acquires data to be subject to a subprocess from the data processors 120, the data collectors 150, and the coordination processor 160, and then outputs the acquired data to the data processor 120, the data collector 150, or the coordination processor 160 to execute the subprocess on the data.

For example, the execution controller 130 acquires the data, collected as a result of the subprocess 411 illustrated in FIG. 2, from the data collector 150, and outputs the acquired data to the data processor 120 to execute the subprocess 412. The execution controller 130 also acquires the data, output as a result of the subprocess 412, from the data processor 120, and transmits the acquired data to the data processing device 20 via the coordination processor 160.

In the case where the subprocesses 42 of the data processing flow 40 illustrated in FIG. 2 are executed in the data processing device 10, the execution controller 130 acquires the data indicating a result of the subprocess 412 from the data processing device 20 via the coordination processor 160, and outputs the acquired data to the data processor 120 that executes the subprocess 421. The execution controller 130 then acquires the data, output as a result of the subprocess 421 from the data processor 120, and outputs the acquired data to the data collector 150 that executes the subprocess 422.

The storage 140 is mainly achieved by the auxiliary storage 13. The storage 140 includes the setting storage 141 to store flow setting information, and a data definition information storage 142 to store data definition information. The setting storage 141 and the data definition information storage 142 may be different storage areas formed in a single storage device, or may be independent storage devices.

FIG. 5 illustrates an example of flow setting information 1411 stored in the setting storage 141. The flow setting information 1411 indicates the setting items necessary for execution of the data processing flow illustrated in FIG. 2. The flow setting information 1411 is table data that associates the subprocess identifier (ID) for identifying a certain subprocess, the platform ID for identifying a platform that executes the certain subprocess, the name of the certain subprocess, the subprocess corresponding to a pretreatment of the certain subprocess, and the subprocess corresponding to an aftertreatment of the certain subprocess, with each other. Although FIG. 5 illustrates the names of subprocesses "collection", "modification", and "diagnosis" for descriptive purposes, the "modification" includes multiple types of processing, such as averaging and sharpening, for example. The names of subprocesses are thus replaced with the IDs specialized for the individual types of processing in practice. The IDs of subprocesses are also used to designate the pretreatments and aftertreatments.

In FIG. 5, the subprocess IDs are defined to be identical to the reference symbols provided to the respective subprocesses in FIG. 2. The platform ID "50" is defined to be identical to the reference symbol of the platform 50 of the data processing device 10 illustrated in FIG. 4. The platform ID "51" indicates the platform of the data processing device 20. Alternatively, the flow setting information 1411 may contain identifiers for identifying the data processing devices 10 and 20, instead of the platform IDs.

The flow setting information 1411 may contain another information different from the setting items illustrated in FIG. 5. For example, the flow setting information 1411 may contain parameters defining the contents of subprocesses. Examples of the parameters include a threshold used in the fraction treatment, an identifier of the machine from which data is collected, a cycle of collecting data, and an identifier of the machine to which control commands are transmitted.

Referring back to FIG. 4, the data collectors 150 are mainly achieved by cooperation of the processor 11 and the communicator 16. Although FIG. 4 illustrates two data collectors 150, which correspond to the respective machines 31 and 32, the data collectors 150 may be provided for the respective transmission lines connected to the data processing device 10. Each of the data collectors 150 executes a process of collecting data output from the machine 31 connected to the data collector 150, and outputs the collected data to the execution controller 130.

The data collector 150 includes an output processing module 151 to transmit output information. The output information is related to a result of execution of the data processing flow. For example, the output processing module 151 transmits control commands output from the execution controller 130 to the machine 32 to be controlled, in the form of the output information. The process of transmitting output information from the output processing module 151 corresponds to the subprocess 422 in FIG. 2. The output information is not necessarily the control commands and may be a notification of occurrence of an error or quality-control information to be stored into an external server apparatus.

The coordination processor 160 is mainly achieved by cooperation of the processor 11 and the communicator 16. The coordination processor 160 conducts communication by which the data processing device 10 executes the data processing flow in coordination with the data processing device 20.

Figure 6:
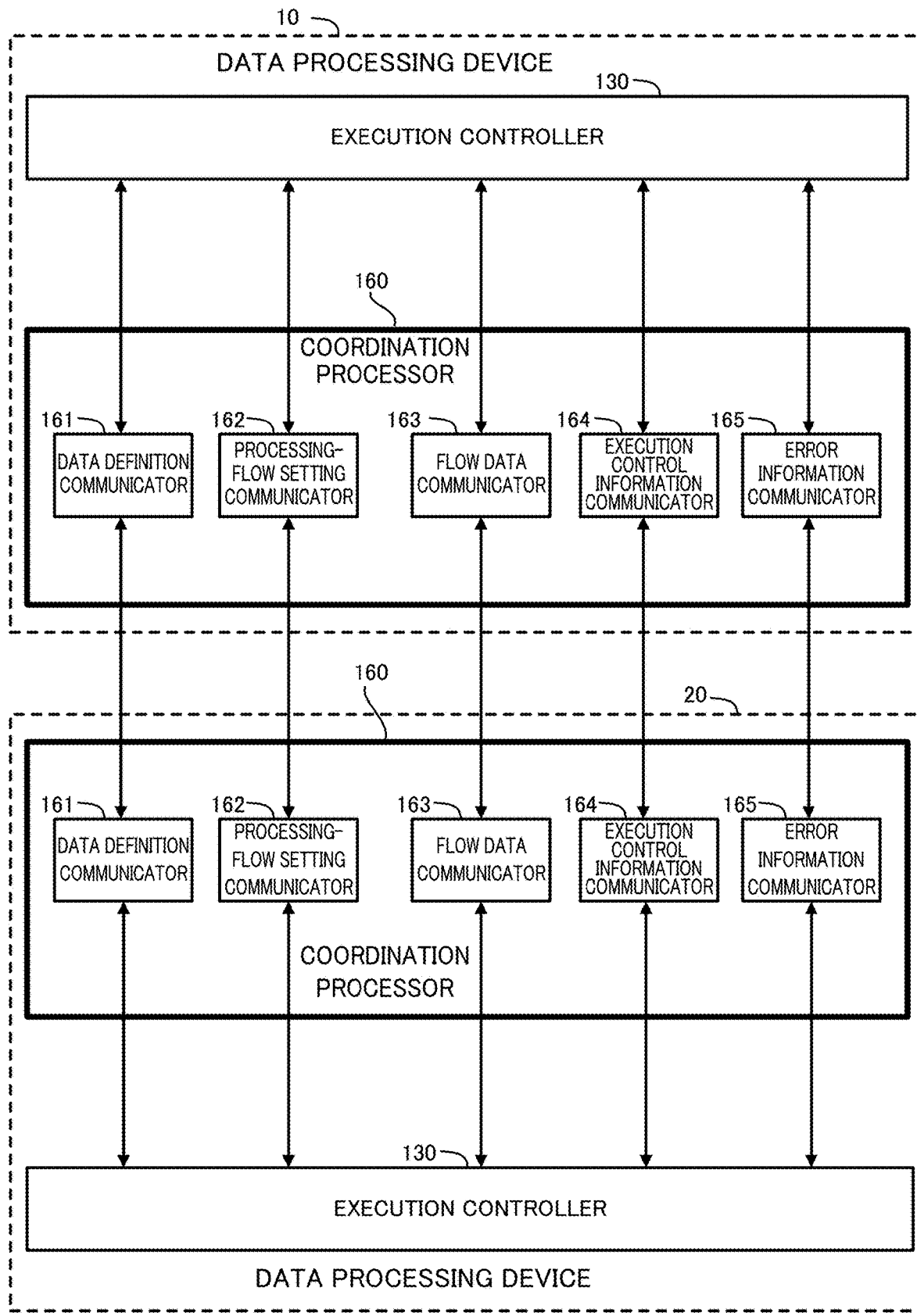
FIG. 6 illustrates a configuration of a coordination processor according to the embodiment.

FIG. 6 illustrates a detailed configuration of the coordination processor 160. The coordination processor 160 includes a data definition communicator 161 for communication to share, with the another data processing device 20, definition (for example, data format and the number of data pieces) on data flowing in the data processing flow indicating the content of the series of real-time data processing, a processing-flow setting communicator 162 for communication to share setting items for the data processing flow with the another data processing device 20, a flow data communicator 163 for transmission and reception of the data flowing in the data processing flow to and from the another data processing device 20, an execution control information communicator 164 for transmission and reception of information for execution control of the individual data processing modules in the data processing flow among the data processing devices, and an error information communicator 165 for communication to share information on errors occurring in the data processing devices among the data processing devices.

The data definition communicator 161 and the processing-flow setting communicator 162 conduct communication necessary for offline processes, with the data processing device 20. In contrast, the flow data communicator 163, the execution control information communicator 164, and the error information communicator 165 conduct communication for online processes, with the data processing device 20.

The offline processes indicate the subprocesses that are necessary for the data processing flow and can be executed without communication between the data processing devices 10 and 20. A typical example of the offline processes is a process of referring to the flow setting information. The process of referring to the flow setting information does not necessarily require communication, provided that the flow setting information has been shared between the data processing devices 10 and 20 in advance of the start of the data processing flow. In another example of the offline processes, data definition information on the flow setting information in the data processing devices 10 and 20 is transmitted and shared between the data processing devices 10 and 20 in advance. Provided that the data definition information has been transmitted between the data processing devices 10 and 20 in advance, the process of referring to the data definition information does not necessarily require communication.

The online processes indicate the subprocesses executed in the condition in which the data processing device 10 is connected to the data processing device 20. In detail, in the case where the process of transmitting a result of a certain subprocess from one of the data processing devices 10 and 20 to the other in the form of an input to the subsequent subprocess is repeated in the online mode, the subsequent subprocess corresponds to an online process.

The data definition communicator 161 deals with information on types of data transmitted and received between the individual processing modules constituting the data processing flow. Examples of this information include a data format and the number of data pieces. The data definition communicator 161 also deals with information on the functions of each data processing device, for example, information on the ability of the data processing device to deal with data processing flows, and information on a type of the data processor existing in the data processing device. The data definition communicator 161 transmits the data definition information to the data definition communicator 161 of the another data processing device 20. The data definition communicator 161 of the another data processing device 20 also transmits data definition information to the data definition communicator 161 of the data processing device 10.

The data definition communicators 161 thus share data definition information with each other and are informed of acceptable specifications of the partner devices. For example, the acceptable data may be different among the data processing devices. In another case, some data processing devices may be incapable of dealing with data processing flows. In this case, the setting information for the data processing flow is shared in the acceptable range of the data processing devices.

For example, some data processing flows may contain a branch at which the processing to be executed branches into multiple ways, or a confluence at which results of multiple subprocesses are input to a single subprocess. A data processing device that cannot recognize such a branch or confluence is instructed to skip the branch or confluence in the data processing flow. Alternatively, the setting information for the data processing flow corresponding to the inacceptable processing part is not transmitted to such a data processing device. The data processing devices do not rewrite the setting information for the data processing flow. Instead, the data processing flow is set by the user. Only the user knows the processing functions of the application and the data processing device equipped with this application. The user is therefore allowed to determine rewriting of the setting information for the data processing flow.

The above-explained sharing of the data definition information allows the data processing devices to flexibly coordinate with each other regardless of different acceptable specifications.

The processing-flow setting communicator 162 deals with setting information indicating a combination and coupling manner of the subprocesses in the data processing flow. The processing-flow setting communicator 162 serves to share the setting items for the data processing flow, in contrast to the data definition communicator 161 serving to share the data definition information.

The data processing flow is shared between the data processing devices 10 and 20. In the case of any overlap of the data processing flow between the data processing devices, only one of the data processing devices is required to set the data processing flow without setting at the individual data processing devices.

The flow data communicator 163 deals with flow data flowing in the data processing flow. The data is treated in the unit of a record, which indicates a group of data collected at a certain timing. Alternatively, the data may be treated in the meaningful unit of multiple records.

In the case of the data processing flow containing a branch, the flow data is transmitted together and in association with the data processing flow. For example, the subprocesses of the data processing flow are preliminarily numbered, and the flow data contains the number in the header and the substantial data in the body.

The execution control information communicator 164 deals with execution control information, such as the order of the individual subprocesses of the data processing flow, information for determining the timing of instruction to start the program, and parameters of the data processor 120. The execution control information communicator 164 shares, with the another data processing device, dynamic information that associates the data processing flow with operation modes and regulates the flow of data in accordance with the data processing flow.

For example, methods of control, such as activation of the data processors 120, are different among data processing devices. Specifically, the data processors 120 are activated on the side of the data processors 120 in some data processing devices, while the data processors 120 are activated by the platform 50 in other data processing devices. In the configuration where the platform 50 controls the data processors 120, the activation is controlled in accordance with information from the execution control information communicator 164.

The execution control information communicator 164 transmits execution control information, such as the order of the individual subprocesses, timings of activation of the data processors 120, and type of acceptable data, to another data processing device that does not deal with data processing flows, and thereby achieves remote control of the another data processing device. The another data processing device is provided with the flow data from the flow data communicator 163, and thus executes the processing in accordance with the data processing flow, under the instruction of the execution control information from the execution control information communicator 164.

The error information communicator 165 transmits error information on an error occurring in the data processing device 10 to the another data processing device 20. The error information communicator 165 also receives error information on an error occurring in the another data processing device 20. These processes allow the data processing devices 10 and 20 to share error information on errors occurring in the data processing devices with each other. The error information is managed in association with the data processing flow and the data processor 120. This configuration can facilitate determination of the site of an error and the cause of the error. The configuration can thus specify which data processor of which data processing device has an error in the data processing flow executed by coordination of the data processing devices 10 and 20, thereby achieving efficient debugging and restoration. The error information communicator 165 transmits and receives error information during the actual operation. The error information communicator 165 may vary the operations in response to occurrence of an error.

The data definition communicator 161 acquires the data definition information read from the data definition information storage 142, and the processing-flow setting communicator 162 acquires the flow setting information read from the setting storage 141. The data definition communicator 161 then transmits the acquired data definition information to the data processing device 20, and the processing-flow setting communicator 162 transmits the acquired flow setting information to the data processing device 20. Also, the data definition communicator 161 stores data definition information received from the data processing device 20 into the data definition information storage 142, and the processing-flow setting communicator 162 stores flow setting information received from the data processing device 20 into the setting storage 141.

The flow data communicator 163 transmits data to be subject to the subprocesses executed in the data processing device 20, and receives data to be subject to the subprocesses executed in the data processing device 10.

The flow data communicator 163 acquires transmission data, which indicates a result of the subprocesses 41 executed in the data processing device 10 in accordance with the flow setting information, from the execution controller 130, and transmits the acquired data to the data processing device 20. The flow data communicator 163 halts transmission of data and waits in the case of limited transmission.

The flow data indicates data input and output to and from the subprocesses in accordance with the data processing flow. The transmission data indicates flow data to be transmitted from the data processing device 10 to the data processing device 20. The transmission data will be hereinafter referred to as "first processing result" as appropriate. In contrast, the flow data to be received at the data processing device 10 from the data processing device 20 is called reception data. This reception data indicates a result of the subprocesses 42 executed in the data processing device 20. The reception data will be hereinafter referred to as "second processing result" as appropriate.

The flow data communicator 163 receives the second processing result, to be subject to the subprocesses that should be executed in the data processing device 10 in accordance with the flow setting information, from the data processing device 20, and outputs the second processing result to the execution controller 130.

A coordinated data processing executed in the data processing device 10 will now be explained with reference to FIGS. 7 to 15. The coordinated data processing is a process in which the data processing device 10 executes a processing flow in coordination with the data processing device 20, and is started by execution of the program in the data processing device 10.

Figure 7:
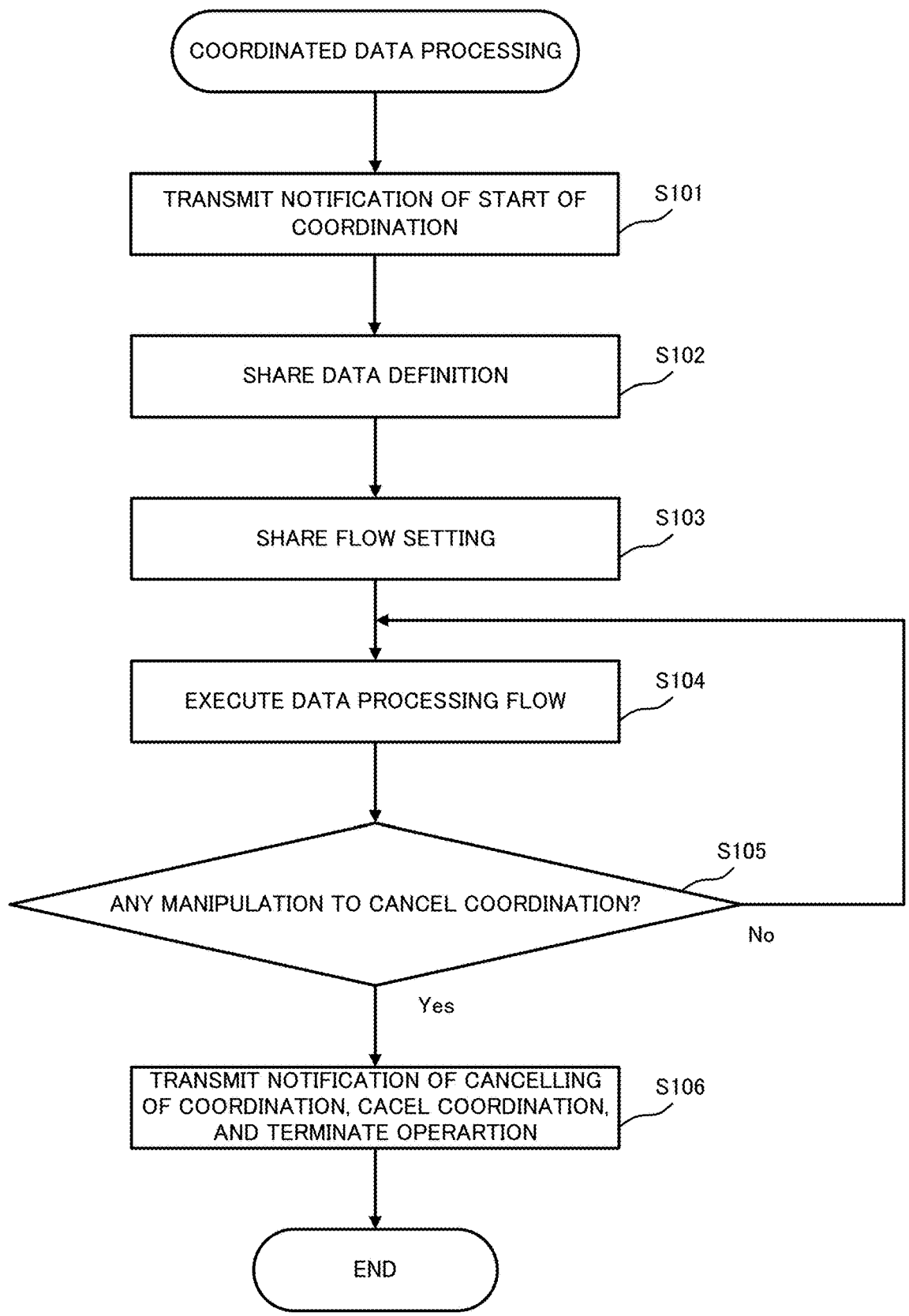
FIG. 7 is a flowchart of coordinated data processing according to the embodiment.

FIG. 7 illustrates an operation of the coordination processor 160. In advance of a notification of start of coordination, the user sets a data processing flow using the engineering tool 110. When the data processing flow is stated in response to a user manipulation or the like, the coordination processor 160 transmits a notification of start of coordination to the partner data processing device 20, which is predetermined in the data processing flow (Step S101).

The coordinate processor 160 then shares definition (for example, data format and the number of data pieces) on data to be transmitted and received between the data processing devices, via the data definition communicator 161 (Step S102).

Figure 8:
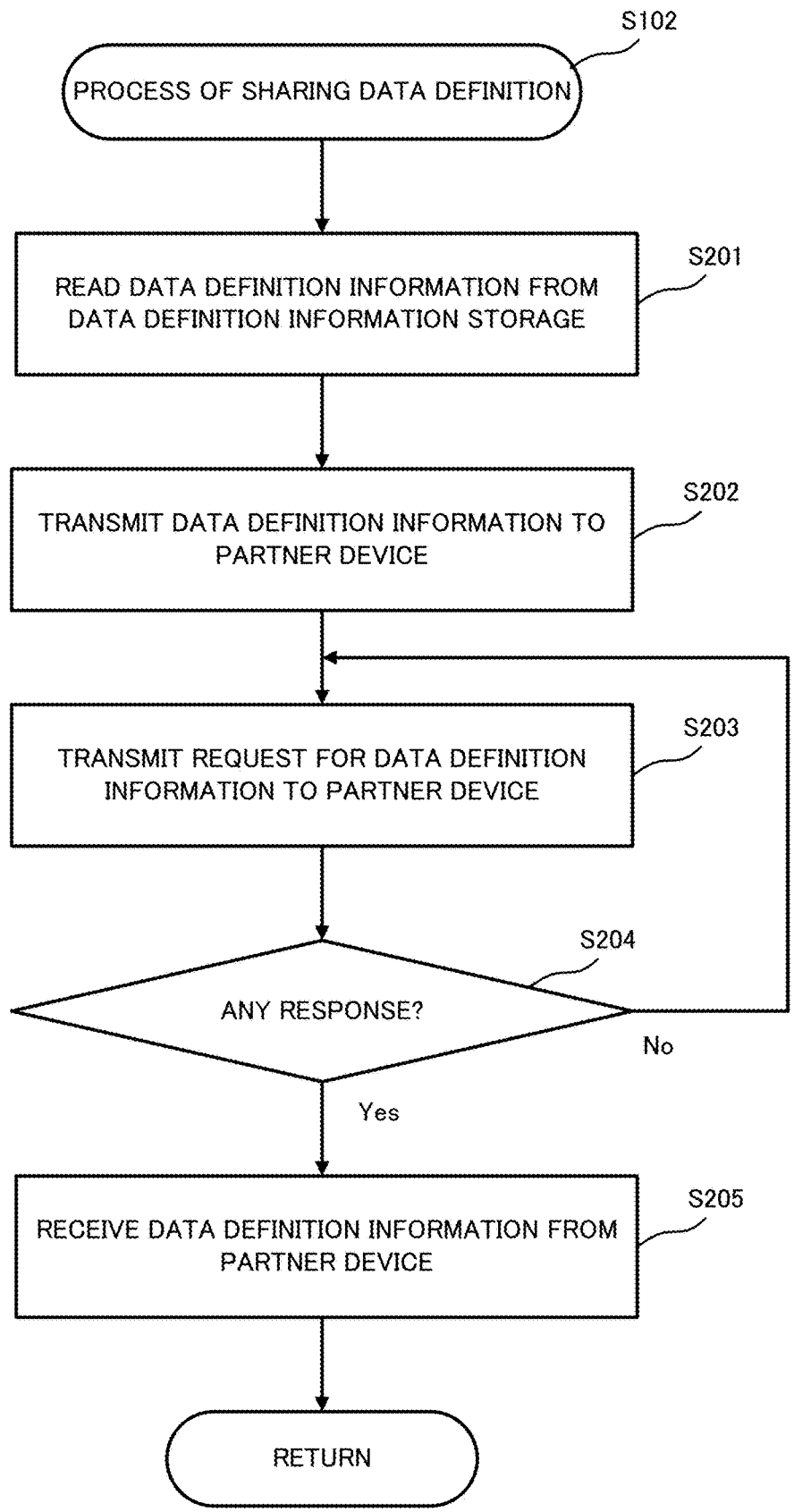
FIG. 8 is a flowchart of a process of sharing data definition according to the embodiment.

The step of sharing the data definition is executed as illustrated in FIG. 8. The data definition communicator 161 reads data definition information from the data definition information storage 142 (Step S201). The data definition communicator 161 then transmits the read data definition information to the partner data processing device 20 (Step S202). The data definition communicator 161 transmits information on types of data transmitted and received between the individual processing modules constituting the data processing flow (for example, data format and the number of data pieces), and information on the functions of each data processing device (for example, information on the ability of the data processing device to deal with data processing flows, and information on a type of data processor existing in the data processing device).

The data definition communicator 161 then transmits a request for data definition information to the partner data processing device 20 (Step S203). When any response to the request is provided from the partner data processing device 20 (Step S204; Yes), the data definition communicator 161 receives data definition information from the data definition communicator 161 of the partner data processing device 20 (Step S205). If no response is provided from the partner data processing device 20 (Step S204; No), the data definition communicator 161 transmits a request for data definition information again (Step S203). The data definition communicator 161 of the partner data processing device 20 also transmits information on types of data transmitted and received between the individual processing modules constituting the data processing flow, and information on the functions of each data processing device. The data definition communicator 161 transmits information on types of data and thereby shares all the data definitions in principle. The data definition communicator 161 shares all the acceptable specifications.

Referring back to FIG. 7, the coordination processor 160 then shares the flow setting via the processing-flow setting communicator 162 (Step S103).

Figure 9:
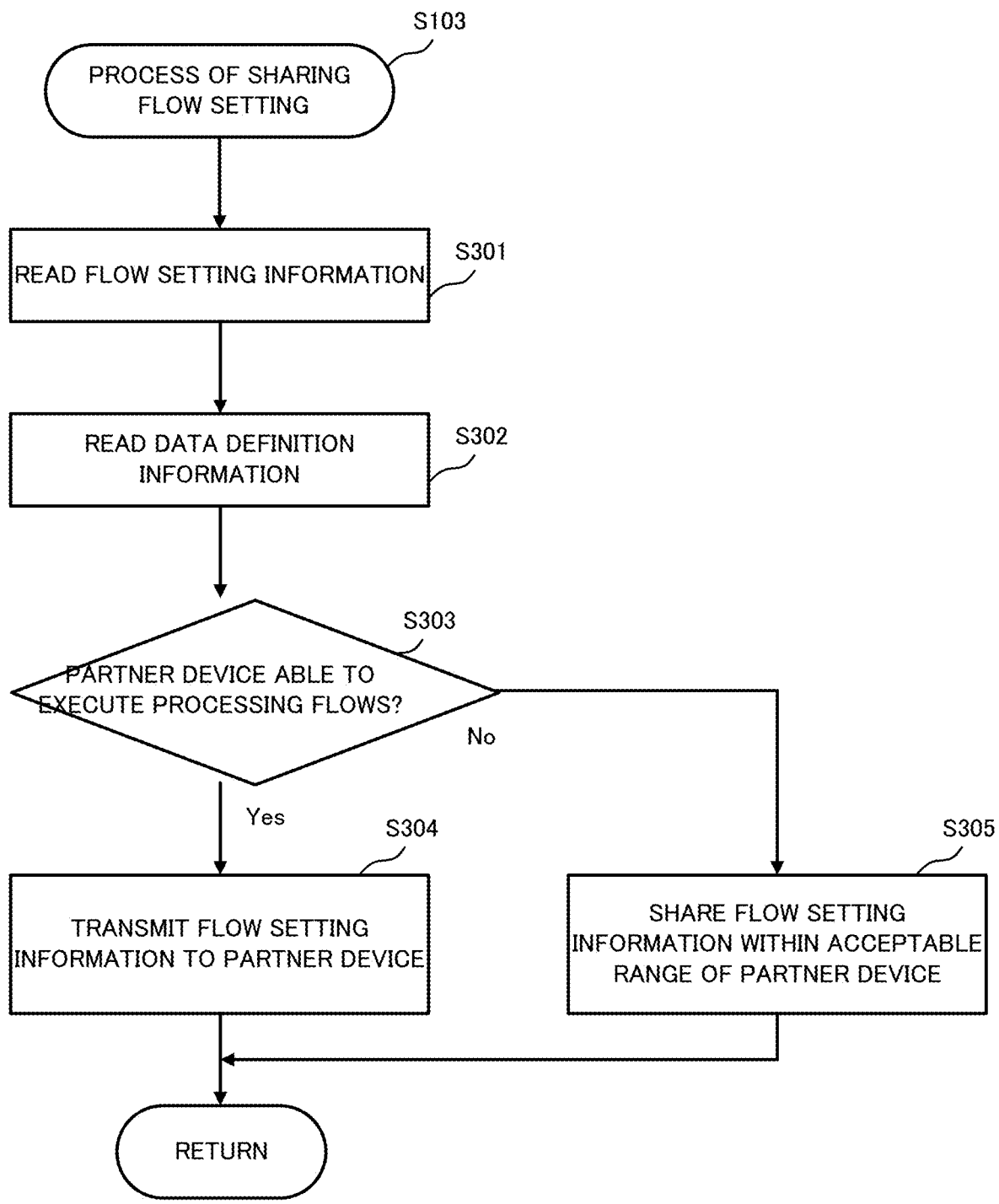
FIG. 9 is a flowchart of a process of sharing flow setting according to the embodiment.

The step of sharing the processing flow is executed as illustrated in FIG. 9.

The processing-flow setting communicator 162 reads flow setting information from the setting storage 141 (Step S301). The processing-flow setting communicator 162 then reads the data definition information for the partner data processing device 20 from the data definition information storage 142 (Step S302). On the basis of the data definition information, the processing-flow setting communicator 162 determines whether the partner data processing device 20 is able to read flow setting information and execute the data processing flow (Step S303).

For example, the processing-flow setting communicator 162 determines whether the partner data processing device 20 is able to deal with the data format and the number of data pieces of the flow data to be subject to the data processing. In an exemplary case where the flow data contains two pieces of 16-bit floating-point data despite of the partner data processing device 20 capable of dealing with only a single piece of 8-bit integer data, the partner data processing device 20 cannot execute the data processing.

Some data processing devices simply collect, accumulate, and distribute data, and some other devices include data processors but lack a mechanism for data processing flows and thus require direct input of data into the individual data processors. Such a data processing device transmits a notification of the functions of the own device and the interfaces to the partner device in this step, and determines the scheme of transmitting and receiving data.

When determining that the partner data processing device 20 is able to execute the data processing flow (Step S303; Yes), the processing-flow setting communicator 162 transmits the original flow setting information to the partner data processing device 20 (Step S304). In contrast, when determining that the partner data processing device 20 is not able to execute the data processing flow (Step S303; No), the processing-flow setting communicator 162 shares the data processing flow within the acceptable range of the partner data processing device 20 (Step S305). For example, the processing-flow setting communicator 162 transmits the flow setting information except for an inacceptable part, or transmitting the flow setting information and an instruction to skip the inacceptable part.

The partner data processing device 20 having flow setting information also transmits the flow setting information to the partner device on the basis of the data definition information, as explained above.

After the step of sharing data, referring back to FIG. 7, the coordination processor 160 executes the data processing flow (Step S104).

Figure 10:
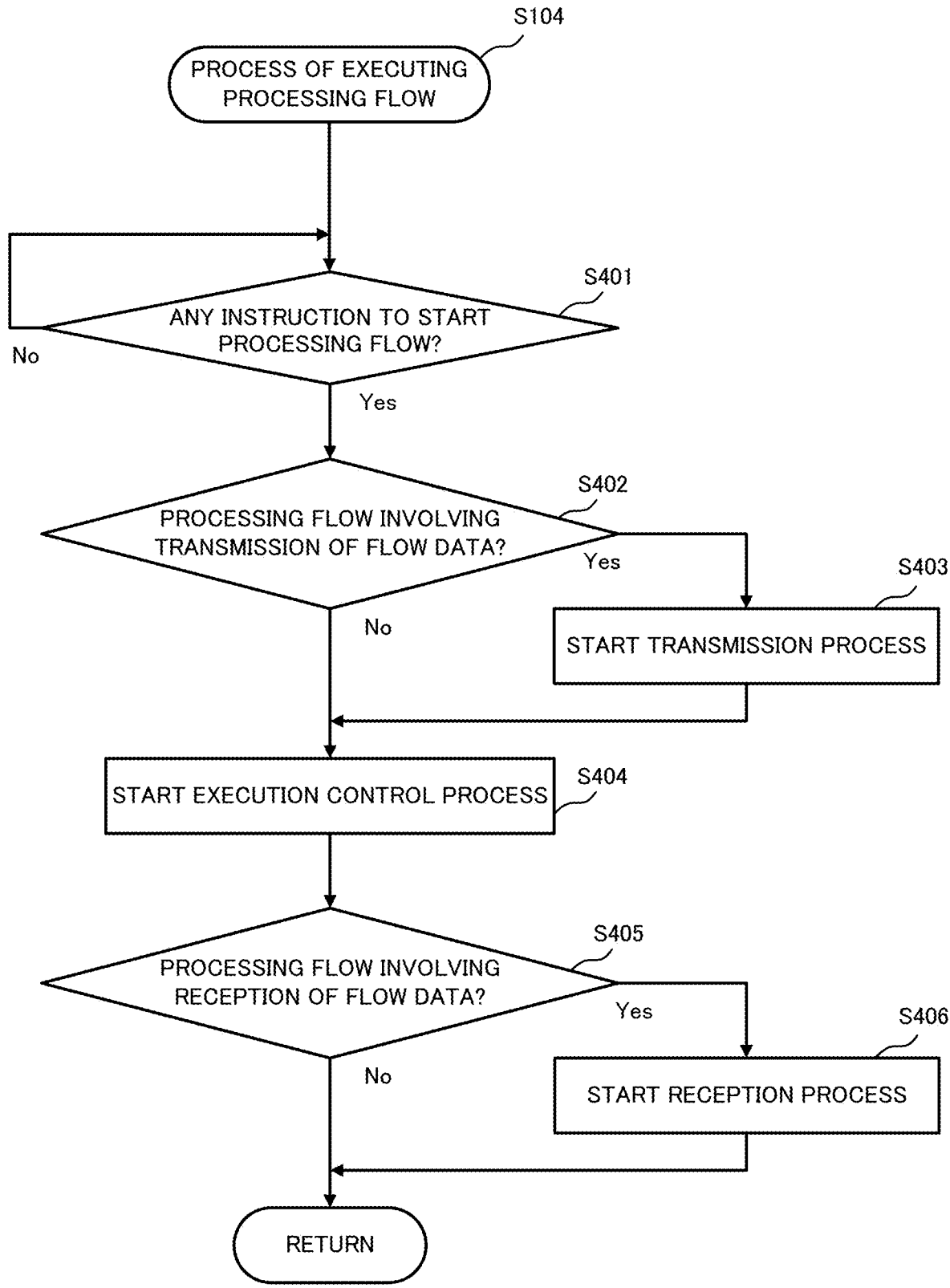
FIG. 10 is a flowchart of a process of executing the data processing flow according to the embodiment.
Figure 11:
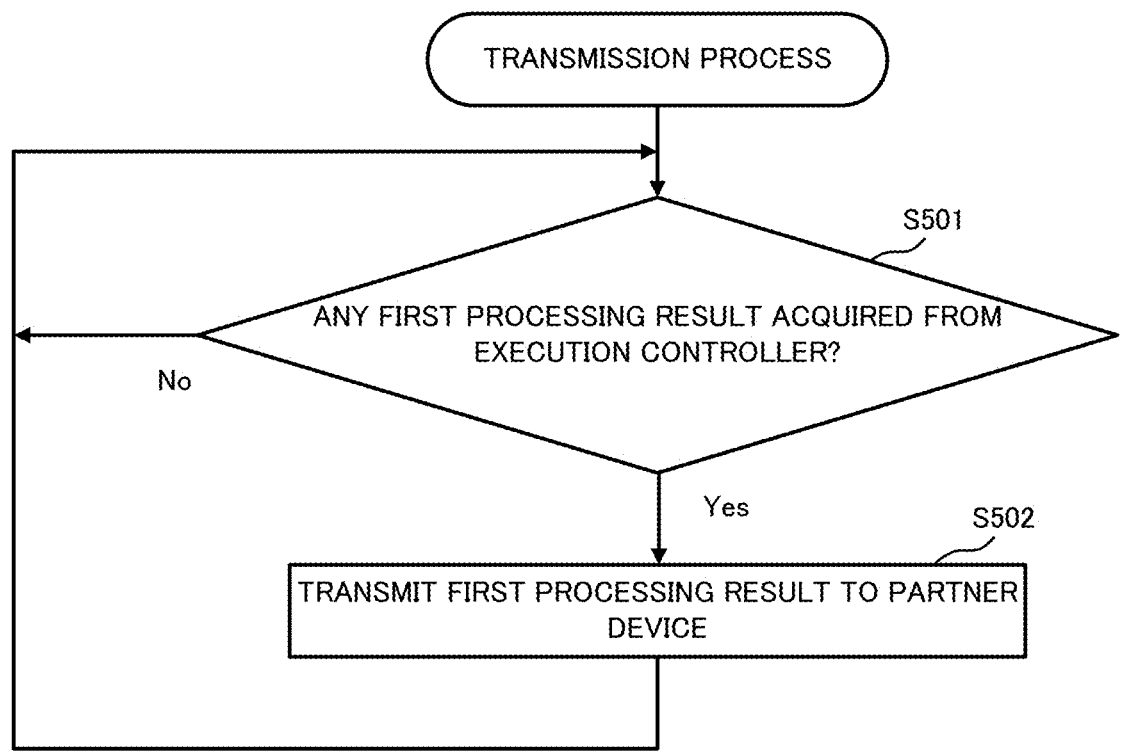
FIG. 11 is a flowchart of a transmission process according to the embodiment.
Figure 12:
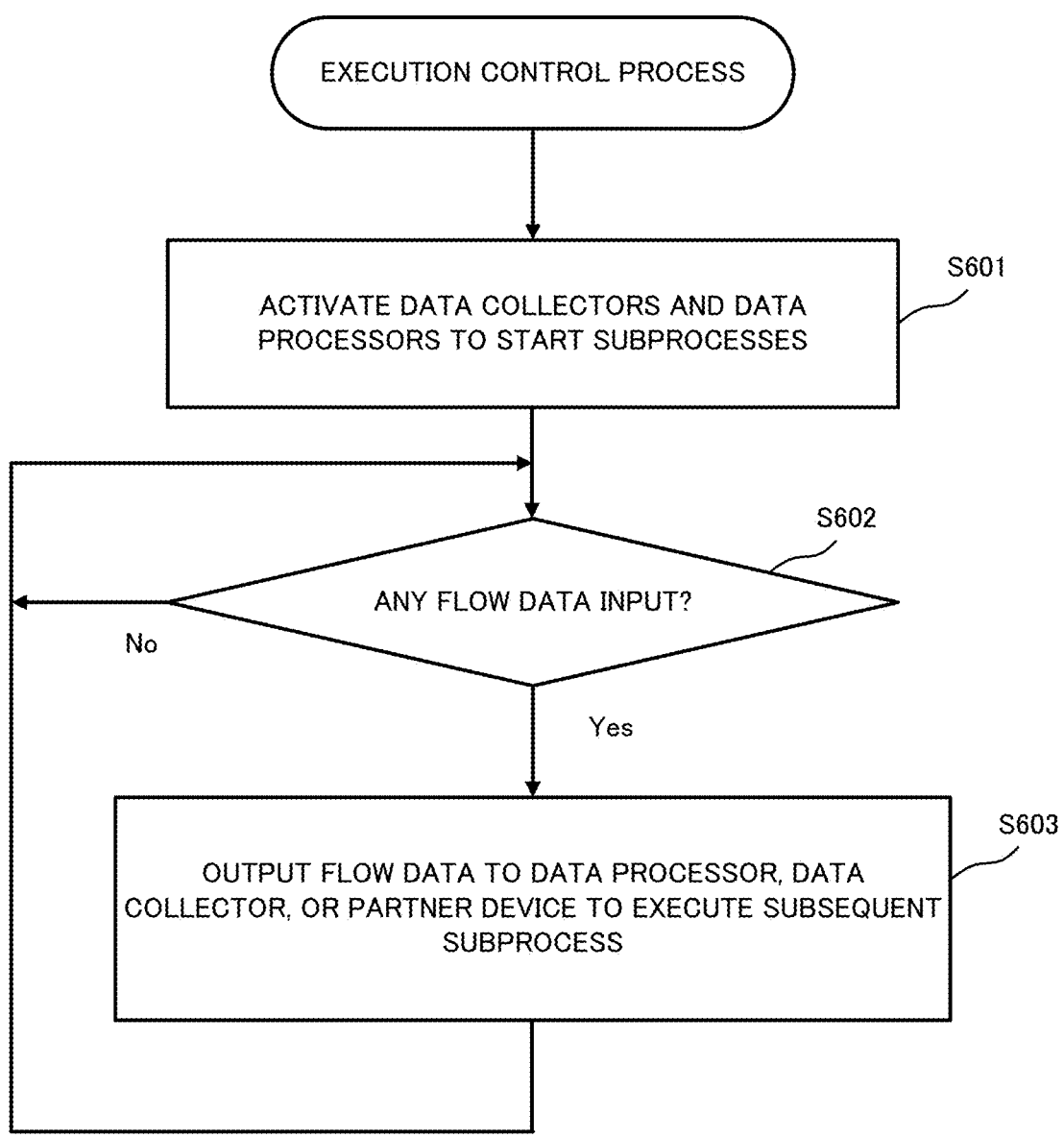
FIG. 12 is a flowchart of an execution control process according to the embodiment.

FIG. 10 illustrates a process of executing the data processing flow. The data processing device 10 determines whether any instruction to start the data processing flow has been provided (Step S401). Specifically, the execution controller 130 determines whether any instruction to start the data processing flow in accordance with the shared flow setting information has been provided. This start instruction may be an instruction input by the user, an instruction transmitted from the data processing device 20, or a trigger to occur at the time defined in the predetermined schedule.

When determining no start instruction (Step S401; No), the data processing device 10 repeats the determination in Step S401 and waits until provision of a start instruction. In contrast, when determining any start instruction (Step S401; Yes), the execution controller 130 determines whether the data processing flow involves transmission of flow data (Step S402). Specifically, the execution controller 130 refers to the flow setting information in the setting storage 141, and determines whether the data processing flow involves inputting a result of the subprocess executed in the data processing device 10 into the subprocess to be executed in the data processing device 20.

When determining that the data processing flow involves transmission of flow data (Step S402; Yes), the execution controller 130 causes the flow data communicator 163 to start a transmission process (Step S403). This transmission process is executed in parallel to the coordinated data processing. The transmission process will now be explained with reference to FIG. 11.

In the transmission process, the flow data communicator 163 determines whether any first processing result, which is a result of the subprocess by the data processor 120, has been acquired from the execution controller 130 (Step S501). When determining that no first processing result has been acquired (Step S501; No), the flow data communicator 163 repeats the determination in Step S501 and waits until acquisition of any first processing result.

When determining that any first processing result has been acquired (Step S501; Yes), the flow data communicator 163 transmits the first processing result to the partner data processing device 20 (Step S502). This step is accompanied by repletion of Step S501 and the following step. That is, the flow data output from the execution controller 130 to the flow data communicator 163 is sequentially transmitted to the data processing device 20.

Referring back to FIG. 10, if no in Step S402 (Step S402; No), or if Step S403 is completed, then the data processing device 10 starts the execution control process (Step S404). In the execution control process, the execution controller 130 causes data to be output and input between the data processors 120, the data collectors 150, and the coordination processor 160 in accordance with the flow setting information. This execution control process is executed in parallel to the coordinated data processing. The execution control process will now be explained with reference to FIG. 12.

In the execution control process, the execution controller 130 activates the data collectors 150 and the data processors 120 to start subprocesses (Step S601). Specifically, the execution controller 130 refers to the flow setting information in the setting storage 141, specifies the program for achieving the data collectors 150 and the data processors 120 that execute the subprocesses involved in the data processing flow, and starts the specified program. This process makes the data collectors 150 and the data processors 120 into the mode for execution of subprocesses.

The execution controller 130 then determines whether any flow data has been input (Step S602). Specifically, the execution controller 130 determines whether any data in accordance with the data processing flow has been output from any of the data processors 120, the data collectors 150, and the coordination processor 160 to the execution controller 130.

Figure 13:
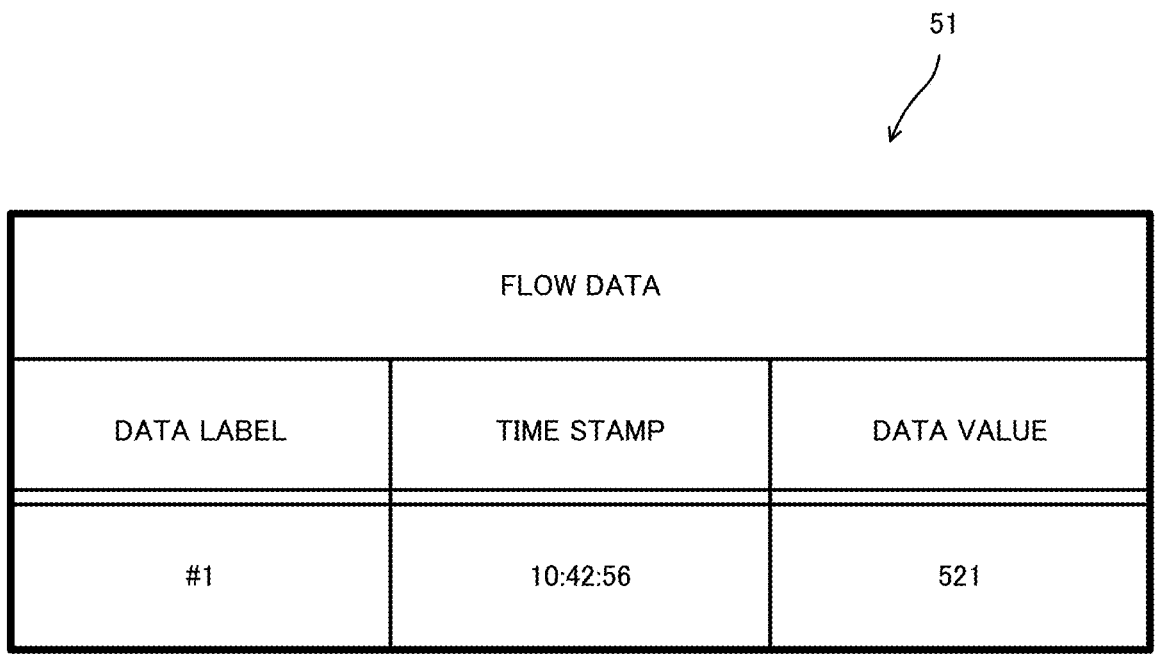
FIG. 13 illustrates an example of flow data according to the embodiment.

FIG. 13 illustrates an example of flow data 51. The flow data 51 is table data that associates a data label provided to certain flow data, a time stamp indicating the time of collection of subject data corresponding to the certain flow data, and a value of the data. The subject data indicates data to be subject to the data processing flow and corresponds to data collected from the machine 31. The data label serves to identify the arrow in FIG. 2. For example, the data output from the subprocess 411 and input to the subprocess 412 in FIG. 2 is provided with a data label "#1". The time stamp indicates the time of collection of subject data after the subprocess for obtaining flow data. For example, in FIG. 2, the subject data collected by execution of the subprocess 411 at 10:42:56 is subject to the subprocesses 411, 412, and 421 in sequence. Each piece of the flow data output from these subprocesses is provided with a time stamp "10:42:56". The value of data indicates a result of the subprocess.

Referring back to FIG. 12, when determining that no flow data has been input in Step S602 (Step S602; No), the execution controller 130 repeats the determination in Step S602 and waits until input of any flow data. In contrast, when determining that any flow data has been input (Step S602; Yes), the execution controller 130 outputs the flow data, of which input is determined in Step S602, to the data processor 120, the data collector 150, or the partner data processing device 20 to execute the subsequent subprocess in accordance with the flow setting information (Step S603). For example, in the case of execution of the data processing flow illustrated in FIG. 2, in response to input of flow data from the data collector 150 that executes the subprocess 411, the execution controller 130 outputs this flow data to the data processor 120 to execute the subprocess 412. Also, in response to input of flow data from this data processor 120, the execution controller 130 outputs this flow data to the flow data communicator 163 of the coordination processor 160, and thereby transmits the flow data to the data processing device 20 to execute the subprocess 421.

Referring back to FIG. 12, after Step S603, the execution controller 130 repeats Step S602 and the following step. The execution controller 130 can thus cause the data processors 120 and the data collectors 150 to repeat the subprocesses that should be executed in the data processing device 10 in the data processing flow involving a series of subprocesses, in accordance with the flow setting information.

Figure 14:
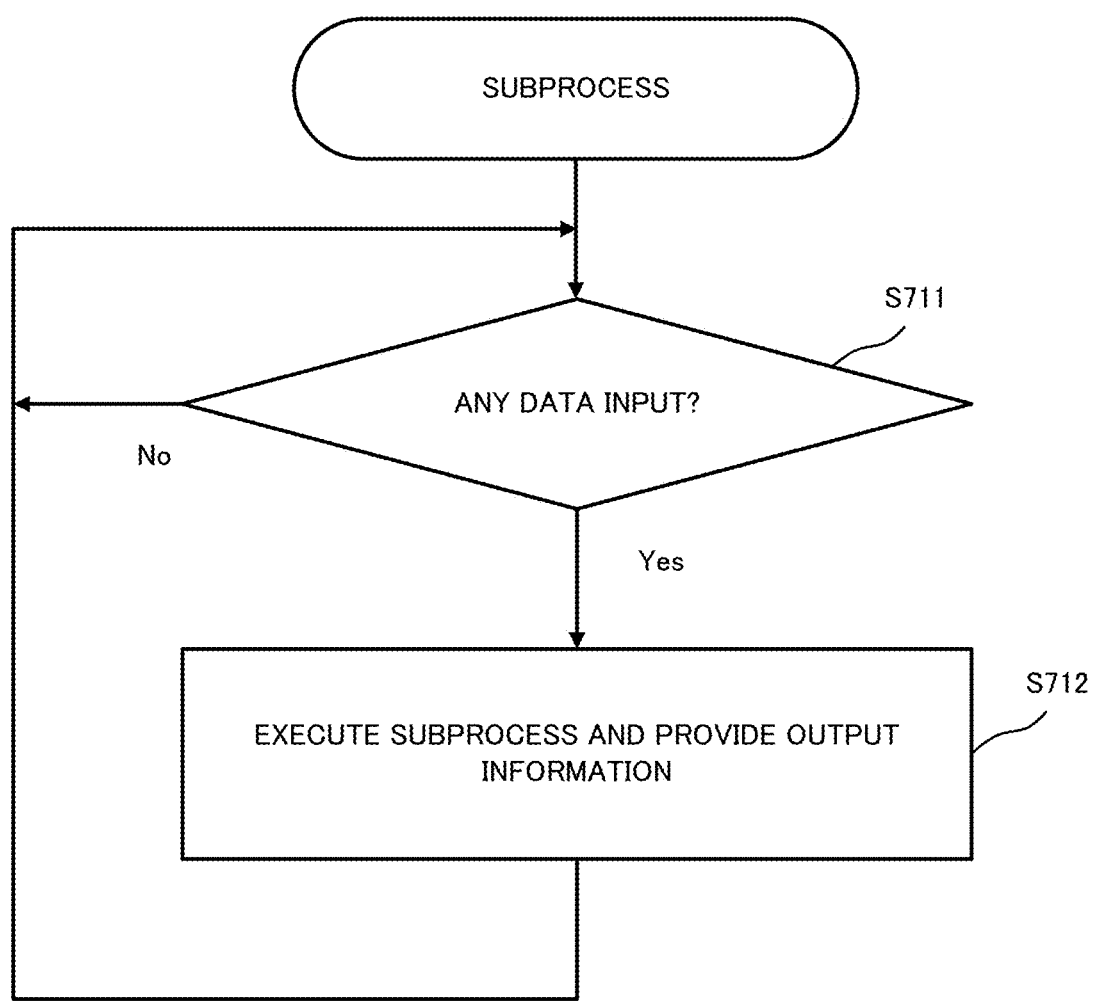
FIG. 14 is a flowchart of a subprocess according to the embodiment.
Figure 15:
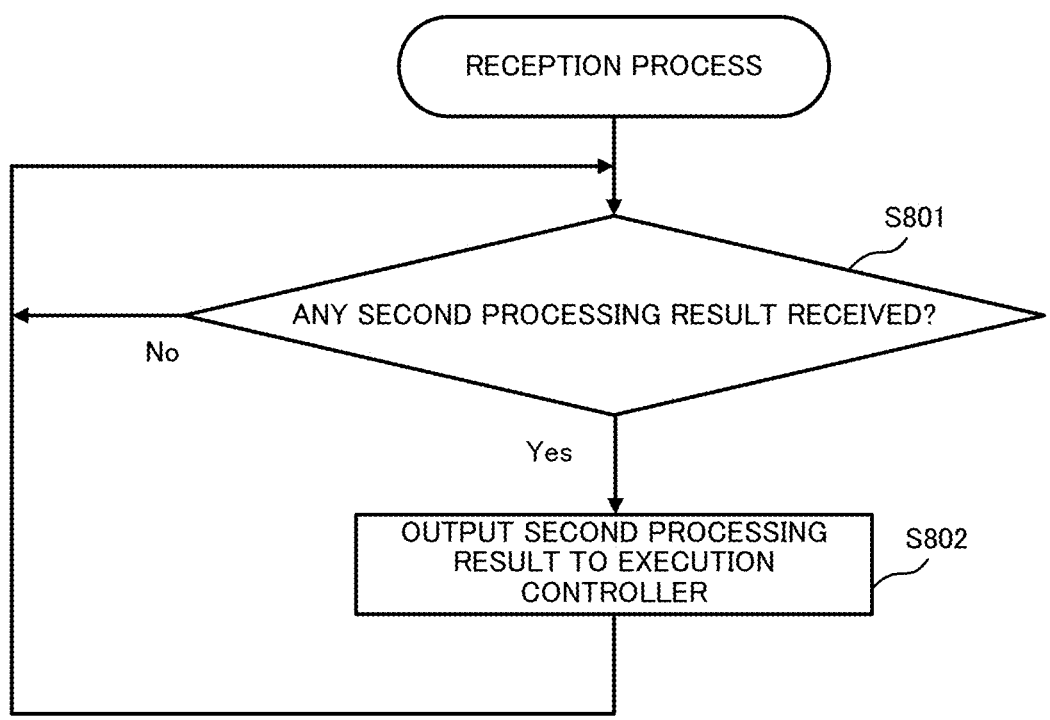
FIG. 15 is a flowchart of a reception process according to the embodiment.

Each of the subprocesses started in Step S601 will now be explained with reference to FIG. 14. This subprocess is achieved by any of the data processors 120 and the data collectors 150 and is executed in parallel to the execution control process. The following explanation is mainly directed to an example in which the subprocess is executed by the data processor 120.

In the subprocess, the data processor 120 determines whether any data has been input (Step S711). Specifically, the data processor 120 determines whether any data output from the execution controller 130 has been input. The data collector 150 determines whether any data output from the machine 31 has been input in the case where the subprocess is executed by the data collector 150.

When determining no input data (Step S711; No), the data processor 120 repeats the determination in Step S711 and waits until input of any data. In contrast, when determining any input data (Step S711; Yes), the data processor 120 executes the subprocess and provides the execution controller 130 with output information indicating a result of the subprocess (Step S712). The data processor 120 then repeats Step S711 and the following step.

Referring back to FIG. 10, after Step S404, the execution controller 130 determines whether the data processing flow involves reception of flow data (Step S405). Specifically, the execution controller 130 refers to the flow setting information in the setting storage 141, and determines whether the data processing flow involves inputting a result of the subprocess executed in the data processing device 20 into the subprocess to be executed in the data processing device 10.

When determining that the data processing flow involves reception of flow data (Step S405; Yes), the execution controller 130 causes the flow data communicator 163 to start a reception process (Step S406). This reception process is executed in parallel to the coordinated data processing. The reception process will now be explained with reference to FIG. 15.

In the reception process, the flow data communicator 163 of the coordination processor 160 determines whether any second processing result, to be subject to the subprocess that should be executed in the data processing device 10, has been received from the data processing device 20 (Step S801). When determining that no second processing result has been received (Step S801; No), the flow data communicator 163 repeats the determination in Step S801 and waits until reception of any second processing result. In contrast, when determining that any second processing result has been received (Step S801; Yes), the flow data communicator 163 outputs the second processing result to the execution controller 130 (Step S802). This step is accompanied by repetition of Step S801 and the following step. That is, the second processing result transmitted from the data processing device 20 to the flow data communicator 163 is sequentially input to the execution controller 130.

Referring back to FIG. 7, if no manipulation to cancel the coordination has been provided in Step S105 (Step S105; No), the coordination processor 160 continues to execute the data processing flow (Step S104). In contrast, if any manipulation to cancel the coordination, such as a manipulation to stop the data processing flow, has been provided (Step S105; Yes), then the coordination processor 160 transmits a notification of cancelling of the coordination to the another data processing device 20, cancels the coordination, and terminates the operation (Step S106). The manipulation indicates a manipulation by the user. Examples of the user manipulation include a manipulation of a toggle switch mounted on the device, or a stop manipulation using the engineering tool 110. The instruction to cancel the coordination may be an instruction transmitted from the data processing device 20, or a trigger to occur at the time defined in the predetermined schedule.

The above-described embodiment of the disclosure should not be construed as limiting the disclosure.

Although the data processing flow is executed in two data processing devices 10 and 20 in coordination with each other in the above-described embodiment, the data processing flow may also be executed in three or more devices in coordination with each other.

Figure 16A:
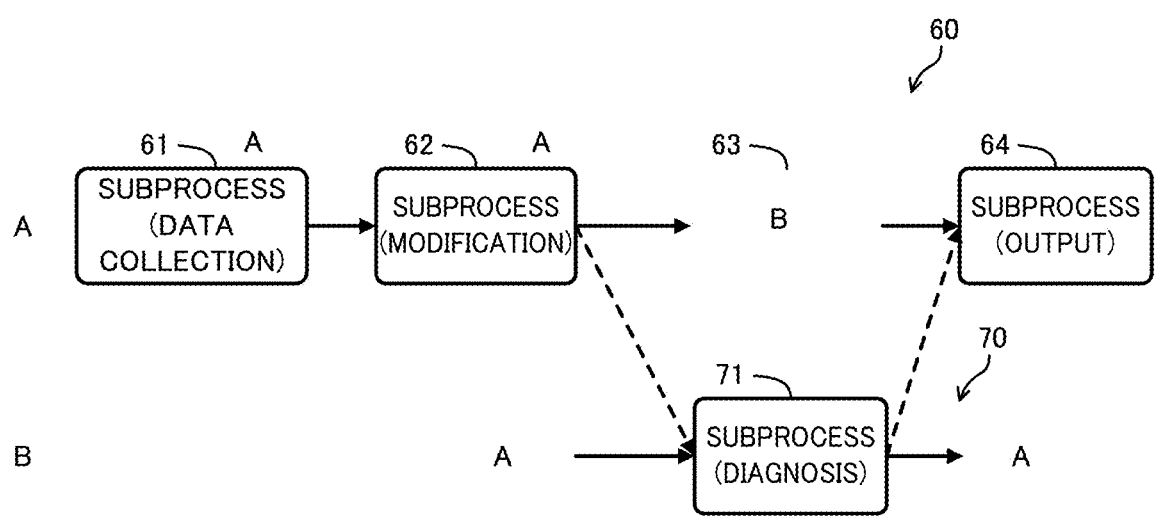
FIG. 16 illustrates data processing flows according to modifications of the embodiment.
Figure 16B:
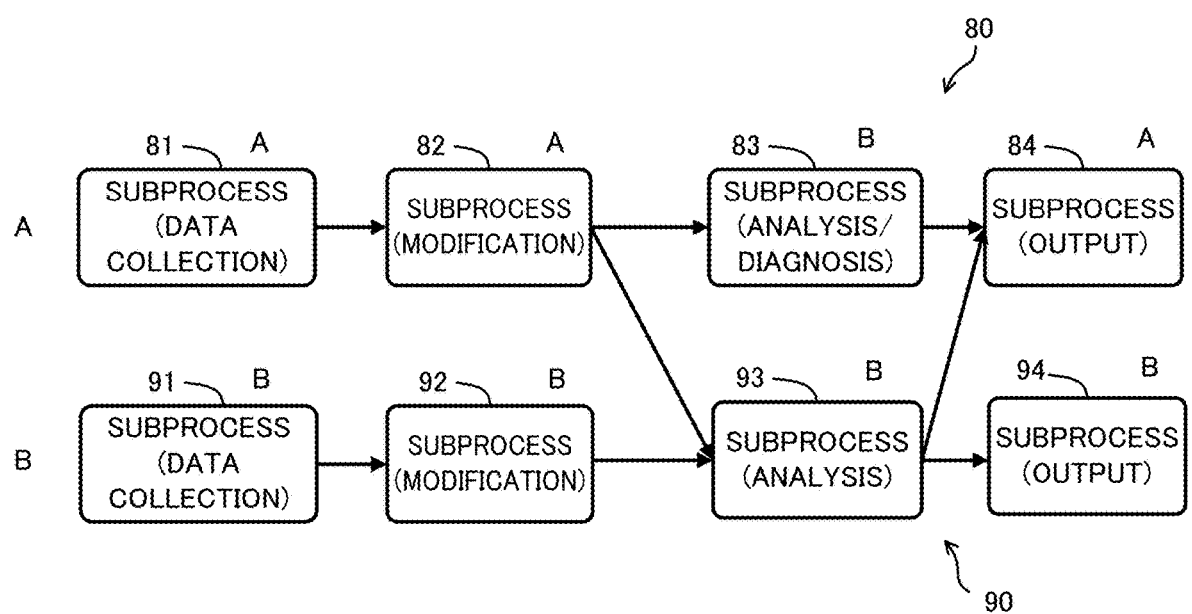

Although FIG. 2 in the above-described embodiment illustrates a simple data processing flow in order to facilitate an understanding, this data processing flow is a mere example. FIG. 16 illustrates another example of a data processing flow.

In the section (A) of FIG. 16, a data processing flow 60 in a data processing device A involves a subprocess 61 first, in which the data processing device A collects data. The data collection is followed by a subprocess 62, in which the data processing device A modifies the data. As a subprocess 63 after the subprocess 62, the data processing flow 60 defines only that the subprocess is executed in a data processing device B. The data processing flow 60 then involves a subprocess 64, in which a result of the subprocess in the data processing device B is transmitted to the data processing device A. In the subprocess 64, the data processing device A feeds the result of the subprocess in the data processing device B back to the machine via the data collector 150.

In contrast, a data processing flow 70 in the data processing device B involves a subprocess 71, in which data is input from the data processing device A. In response to input of data from the data processing device A, the data processing device B diagnoses the data. A result of the diagnosis is transmitted to the data processing device A.

The data processing devices A and B transmit and share the data processing flow 60 in the data processing device A and the data processing flow 70 in the data processing device B with each other. This sharing operation allows the data processing device A to find that the subprocess in the data processing device B involved in the data processing flow 60 is diagnosis. The data processing devices mutually share data processing flows and are therefore not required to retain the overlapped data processing flows.

In the section (B) of FIG. 16, a data processing flow 80 in the data processing device A involves a subprocess 81 first, in which the data processing device A collects data. The data collection is followed by a subprocess 82, in which the data processing device A modifies the data. The modification is then accompanied by a branch. In detail, while the data processing device A executes a subprocess 83 indicating an analytic/diagnostic subprocess, the data processing device B executes an analytic subprocess. A result of the analytic subprocess in the data processing device B is transmitted to the data processing device A. In the subprocess 84, the data processing device A feeds a result of the analytic/diagnostic subprocess back to the machine via the data collector 150.

In contrast, a data processing flow 90 in the data processing device B involves a subprocess 91 first, in which the data processing device B collects data. The data collection is followed by a subprocess 92, in which the data processing device B modifies the data. After the subprocess 92, a result of the modification in the data processing device B and a result of the modification in the data processing device A are gathered in the data processing device B, followed by a subprocess 93 in which the data processing device B analyzes the data. In the subprocess 94, the data processing device B feeds a result of the analysis back to the machine via the data collector 150.

The data processing flow may involve subprocesses executed in three or more data processing devices. The data processing devices and the platforms do not necessarily have one-to-one correspondence. For example, a single data processing device may have multiple platforms.

The functions of the data processing device 10 may be achieved by dedicated hardware or an ordinal computer system.

For example, the program P1 to be executed by the processor 11 may be stored in a non-transitory computer-readable recording medium for distribution and then installed in a computer to configure a device for performing the above-explained processes. Conceivable examples of such a non-transitory recording medium include a flexible disk, a compact disc read-only memory (CD-ROM), a digital versatile disc (DVD), and a magneto-optical disc (MO).

The program P1 may also be stored in a disk drive included in a server apparatus on a communication network, represented by the Internet, and may be downloaded into a computer by being superimposed on a carrier wave, for example.

Alternatively, the program P1 may be activated while being transferred through a communication network to perform the above-explained processes.

A server apparatus may execute all or part of the program P1 and a computer may execute the program P1 while transmitting and receiving information on the executed processes to and from the server apparatus via a communication network, to perform the above-explained processes.

In the case where the above-described functions are achieved by an operating system (OS) or by cooperation of the OS and applications, only the components other than the OS may be stored in a non-transitory medium for distribution or downloaded into a computer, for example.

The functions of the data processing device 10 may also be performed by means other than software. Part or all of the functions may be performed by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The disclosure is widely applicable to data processing devices that execute data processing, such as modification and diagnosis, on collected data.

REFERENCE SIGNS LIST

10, 20 Data processing device
11 Processor
12 Main storage
13 Auxiliary storage
14 Inputter
15 Outputter
16 Communicator
17 Internal bus
100 Data processing system
110 Engineering tool
111 UI
112 Receiver
120 Data processor
130 Execution controller
140 Storage
141 Setting storage
142 Data definition information storage
150 Data collector
151 Output processing module
160 Coordination processor
161 Data definition communicator
162 Processing-flow setting communicator
163 Flow data communicator
164 Execution control information communicator
165 Error information communicator
1411 Flow setting information
30 Communication path
31, 32 Machine
40, 60, 70, 80, 90 Data processing flow
41 First subprocesses
42 Second subprocesses
411, 412, 421, 422, 61, 62, 63, 64, 71, 81, 82, 83, 84, 91, 92, 93, 94 Subprocess
50 Platform
51 Flow data
P1 Program

The invention claimed is:

1. A data processing device connectable to another data processing device, the data processing device comprising:
   a data collector to collect data from a machine and output, to the machine, information relating to a result of execution of a data processing flow;
   a data processor to process input data including the data collected by the data collector;
   a coordination processor to provide the data collector or the data processor with data transmitted from the another data processing device, and provide the another data processing device with the data collected by the data collector or the data processed by the data processor; and
   an execution controller to control collection and output of data by the data collector, processing of data by the data processor, and transmission and reception of data to and from the another data processing device by the coordination processor, in accordance with predetermined flow setting information that is information that includes settings required for execution of the data processing flow, wherein
   the coordination processor shares data definition information with the another data processing device, the data definition information defining acceptable data and data processing, and shares, based on the data definition information, the flow setting information with the another data processing device by transmitting to the another data processing device (i) the flow setting information except for an inexecutable part that is inexecutable by the another data processing device or (ii) an instruction to skip the inexecutable part.

2. The data processing device according to claim 1, wherein the coordination processor comprises a processing-flow setting communicator to transmit the flow setting information to the another data processing device and thereby share the flow setting information with the another data processing device.

3. The data processing device according to claim 2, wherein the coordination processor further comprises a data definition communicator to transmit the data definition information to the another data processing device and thereby share the data definition information with the another data processing device.

4. The data processing device according to claim 1, wherein the coordination processor comprises an execution control information communicator to transmit execution control information on the data processor in the another data processing device to the another data processing device and thereby share the execution control information with the another data processing device.

5. The data processing device according to claim 1, wherein the coordination processor comprises an error information communicator to transmit error information on an error occurring in the data processing device to the another data processing device and thereby share the error information with the another data processing device.

6. A data processing system comprising:
a plurality of the data processing devices each corresponding to the data processing device according to claim 1.

7. The data processing device according to claim 1, wherein the data definition information is information on types of data transmitted and received between individual processing modules constituting the data processing flow.

8. The data processing device according to claim 7, wherein the data definition information is at least information on a data format or a number of data pieces.

9. The data processing device according to claim 1, wherein the data definition information is information on a function of each the data processing device and the another data processing device.

10. The data processing device according to claim 9, wherein the data definition information is at least information indicating ability of the data processing device to deal with a data processing flow or information indicating a type of data processor existing in the data processing device.

11. A data processing method executable by a data processing device to be connected to another data processing device, the method comprising:
transmitting a notification of start of coordination to the another data processing device as a coordination partner, in accordance with flow setting information that is information that includes settings required for execution of a data processing flow;
sharing data definition information defining acceptable data and data processing with the another data processing device;
sharing, based on the data definition information, the flow setting information with the another data processing device by transmitting to the another data processing device (i) the flow setting information except for an inexecutable part that is inexecutable by the another data processing device or (ii) an instruction to skip the inexecutable part; and
executing data processing in coordination with the another data processing device, in accordance with the shared flow setting information.

12. A non-transitory computer readable recording medium storing a program, the program causing a computer connectable to a data processing device to:
transmit a notification of start of coordination to the data processing device as a coordination partner, in accordance with flow setting information that is information that includes settings required for execution of a data processing flow;
share data definition information defining acceptable data and data processing with the data processing device;
share, based on the data definition information, the flow setting information with the data. processing device by transmitting to the another data processing device (i) the flow setting information except for an inexecutable part that is inexecutable by the another data processing device or (ii) an instruction to skip the inexecutable part; and
execute data processing in coordination with the data processing device, in accordance with the shared flow setting information.

* * * * *